Sept. 2, 1952  B. H. LOCKE  2,609,027

ANTISKID CHAIN AND POSITIONING MEANS

Filed July 6, 1949

INVENTOR
Burton H. Locke

Patented Sept. 2, 1952

2,609,027

UNITED STATES PATENT OFFICE 2,609,027

ANTISKID CHAIN AND POSITIONING MEANS

Burton H. Locke, Framingham, Mass.

Application July 6, 1949, Serial No. 103,205

2 Claims. (Cl. 152—213)

This invention relates to improvement in antiskid chains and especially in means to facilitate positioning antiskid chains onto conventional tire mounted vehicle wheels prior to connecting the ends of the chains in attachment to the wheel; and the main object of the invention is to afford a means that is appliable to conventional antiskid chains for the purpose of eliminating the necessity of jacking up the vehicle wheel and reaching over the same to mount the chain thereon, prior to connecting the ends thereof, and to afford a structure that, by reason of its being small, yet operatively effective, can be permanently attached to the chain when the chain is constructed, or can be permanently attached thereto thereafter by the user, so that the same will remain attached to the chain and always be at hand when required, yet will not interfere with the normal operation of the chain after the chain is connected in operative position on the wheel.

Another object is to provide an independent structure that can be applied to any size conventional antiskid chain and one that is suitable for effecting positioning of chains on various diameters of wheels and widths of tires.

Another object is to provide a structure that affords a very substantial and reliable means to attach an end of the side chain members of antiskid chains to the tire retaining rims of the wheel, respectively, and thereby position the ends of the chain properly to carry the chain into proper position on the wheel as the wheel is rotated.

Another object is to provide a device that can be easily attached to and be detached from a conventional wheel rim, as required, to afford quick manipulation when positioning the chain for application to the wheel.

Another object is to afford a device that by reason of being of a resilient construction is not susceptible of becoming permanently distorted, or otherwise being rendered unworkable, through long service.

Another object is to produce a device that by reason of being simple in construction can be produced at a relatively low cost and, therefore, can be offered to the consumer at a low cost.

Figure 1:
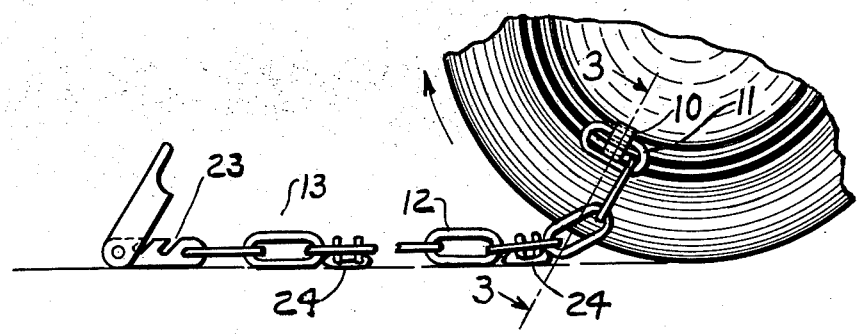
Figure 1 is a fragmental elevation of an antiskid chain as it would appear attached to vehicle wheel rims by means of my positioning clip.
Figure 2:
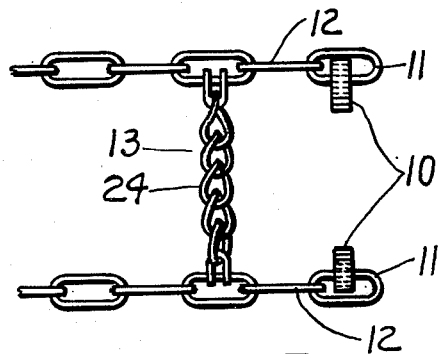
Figure 2 is a fragmental plan view of an antiskid chain with my positioning means incorporated therein.
Figure 3:
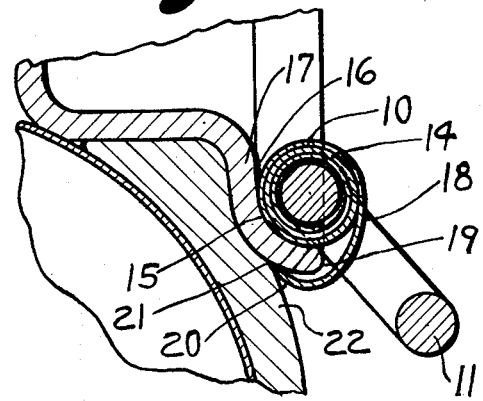
Figure 3 is an enlarged fragmental section taken on line 3—3, of Figure 1.

My antiskid chain positioning means is shown, combined with a chain, in its simplest and preferred form by Figures 1, 2 and 3, which is in the form of a wound clip 10 constructed of a single flat piece of resilient material coiled in a similar manner to a torsion spring. Clip 10, being in the form of a coil of resilient material, which comprises a relatively long length of the material, provides more effective resilient clamping to a wheel rim, in a manner to be set forth hereinafter, than if it was constructed of a relative short length of resilient material attached to a rigid round bar portion. Furthermore, this coiled type of construction affords maximum resiliency of the clip in all directions which facilitates sliding the clip onto the rim and insures a substantial even seatage thereon thereafter. Also, inasmuch as the clip 10 is completely formed from a single strip of material it can be produced at a relatively low cost.

Each antiskid chain requires at least two of the clips 10, one being attached to adjacent end links 11, of each of the normal side chain portions 12, of a conventional antiskid chain 13, as shown in Figures 1, 2 and 3. The antiskid cross chain portions 24, of the chain 13, are attached to the side chain portions in the usual conventional manner.

The clips 10, when constructed as part of the chain, can be wound about the end links 11, of the chain, as shown in Figure 3, and thereby be afforded permanent attachment to the chain which would eliminate the possibility of the clips becoming detached from the chain and lost. Obviously, since the clips are permanently attached to the chain they are always at hand when required for use.

The coiled portion 14, of each clip 10, is of proper size to seat snugly and securely within the normal concaved portion 15, of the outside surface 16, of the conventional tire retaining rim 17. The outer end portion 18, of the coiled portion 14, is arculated outward therefrom and curved inward to extend over the periphery 19, of rim 17, and the extreme end 20, of portion 18, contacts the inner surface 21, thereof, adjacent to the tire 22 and thereby affords resilient clamping of the clip 10 to the rim 17. Inasmuch as the extreme outer end 20, of clip 10, contacts the inner convex side of rim 17, relative easy spreading of the clip is effected which minimizes the pressure required to slide the clip onto the rim. However, maximum pull is required to remove the clip from the rim due to the tendency of the outer edge 20 to "dig in" to the rim upon being pulled therefrom. That is, an outward pull on link 11, of the side chain 12, will tend to cause clip 10 to swing clockwise, with reference to Figure 3, about the periphery 19, of the wheel rim 17, which would tend to cause the end 20, of clip 10, to be forced away from the body portion 14, of said clip, and thereby the pressure contact of end 20 with rim 17 will be increased and, therefore, relatively tighter gripping of said clip onto the said rim would be afforded by any pull of the chain on the clip. Therefore, maximum clamping of clip 10 to rim 17 is afforded.

The clips 10 are slid onto rim 17 by manual pressure exerted by one's thumb or finger which causes the portion 18, of clip 10, to yield and admit the said rim between it and the coiled portion 14. The resilient clamping moment of the clips 10 to the rims 17 is utilized to pull the antiskid chain 13 over and around the vehicle wheel when the wheel is rotated, clockwise as shown in Figure 1, by the vehicle being driven forward, the chain being previously attached to the rear lower part of the wheel rims by the clips 10 being slid onto the respective rims. The chain is generally spread out on the ground, or floor, in alignment with the wheel after the clips are attached to the rims. It will be noted that the attached ends of the chains are positioned well around the sides of the tire, respectively, by being attached closely to the tire retaining rims by the clips. This insures that the chain be pulled evenly and into proper position over the tire as the wheel is rotated to position the chain.

The vehicle is driven forward until the wheel has made at least one revolution which causes the chain to be carried up and over and then around the wheel and thereby bringing the opposite ends of the side chains together for interconnecting by means of conventional hooks 23 to retain the chain onto the wheel. Before the ends of the chains are connected, the clips are removed from the rims by a manual pull on the side chains. The clips 10, being relatively small, and also by reason of being positioned on the side chains, will not interfere with the normal functioning of the antiskid chains.

It will be noted that this means of positioning antiskid chains on a wheel eliminates the necessity of jacking up the vehicle. It also eliminates the necessity of reaching over the wheel which is extremely difficult to accomplish on the present day vehicles which have low fenders.

Figure 5:
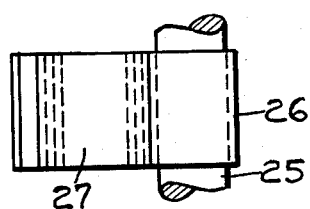
Figure 5 is a plan view of the modification shown in Figure 4.
Figure 4:
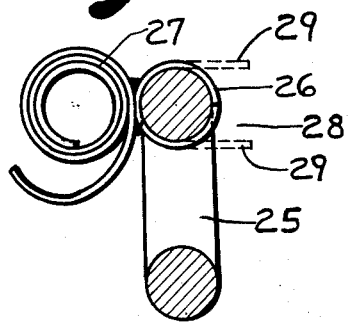
Figure 4 is an enlarged end view of a modification of the attaching structure.

The embodiment of the invention shown by Figures 4 and 5 provides a construction that can be attached to a link 25 of the side chain of an antiskid chain by a chain user. This construction provides an attaching member 26, that is attached to the coiled clip 27, by welding, or pinning, or other suitable means, which is suitable to be clinched around the link 25. The member 26 is furnished with an open end 28 which is provided by the ends of the member 26 being constructed as shown by dotted lines 29 for the user to clinch around the link 25.

It is obvious that the clips 10 would be suitable for mounting on conventional wheels of different diameters and also could be easily adapted to different types and sizes of antiskid chains.

Obviously there are other ways of forming spring clips that would serve in a satisfactory manner for the purpose set forth.

Therefore, I do not wish to be confined to the exact details as the same are susceptible of modification within the scope of the claims to follow.

I claim:

1. An antiskid chain for vehicle wheels that have a pair of rim flanges and a tire mounted therebetween comprising two side chain portions, one to pass around the wheel at each side of the tire, respectively, a plurality of antiskid cross chain portions connecting to each side chain and disposed to pass laterally over the tire, a resilient clip attached to each of the said side chains substantially at adjacent ends thereof, each of said clips being in the form of a coiled torsion spring to seat against the outer side of one of the said rim flanges of the said wheel, the outer end portion of said coiled spring being arcuate outwardly to pass over the periphery of the respective rim flange to dispose the extreme outer end portion of said spring in position to make yieldable contact with the inner side of the same rim flange, means on each of the said side chains to afford interconnection of the ends of each to attach the complete chain onto a vehicle wheel.

2. A resilient clip comprising a body portion in the form of a wound torsion spring having a plurality of closely wound coils, the outer free end portion of the spring being arcuated outwardly from the body portion and then inwardly suitably to dispose a portion intermediate the said body portion and the extreme end of the clip farther from the said body than the extreme end is disposed therefrom, means on said clip to attach the clip to a side chain of a conventional antiskid chain for a vehicle wheel.

BURTON H. LOCKE.

REFERENCES CITED

The following references are of record in the file of this patent:

UNITED STATES PATENTS

| Number | Name | Date |
| --- | --- | --- |
| 340,419 | Clason | Apr. 20, 1886 |
| 781,629 | Ahlstrom | Feb. 7, 1905 |
| 793,332 | Walker | June 27, 1905 |
| 1,244,628 | Meyer | Oct. 30, 1917 |
| 1,253,164 | Felicetti | Jan. 8, 1918 |
| 1,253,740 | Smith | Jan. 15, 1918 |
| 1,425,806 | Swift | Aug. 15, 1922 |
| 1,511,002 | Pfautz | Oct. 7, 1924 |
| 1,740,092 | Hodell | Dec. 17, 1929 |
| 1,986,517 | Mitcheson | Jan. 1, 1935 |
| 2,354,746 | Duzmal | Aug. 1, 1944 |
| 2,484,714 | Kapp | Oct. 11, 1949 |

FOREIGN PATENTS

| Number | Country | Date |
| --- | --- | --- |
| 729,171 | Germany | Dec. 11, 1942 |